United States Patent [19]

Frisbee

[11] Patent Number: 5,230,398
[45] Date of Patent: Jul. 27, 1993

[54] MACHINE WITH DUAL-FUNCTION PANEL MEMBER

[75] Inventor: Claude M. Frisbee, Schofield, Wis.

[73] Assignee: Case Corporation, Racine, Wis.

[21] Appl. No.: 872,060

[22] Filed: Apr. 22, 1992

[51] Int. Cl.⁵ ............................................. B60K 37/00
[52] U.S. Cl. ..................................... 180/90; 180/90.6; 296/75; 70/237; 70/258
[58] Field of Search ......................... 180/287, 90, 90.6; 296/75, 70; 70/237, 238, 258, 158, 198, 159, 160; 244/224; 74/564

[56] References Cited

U.S. PATENT DOCUMENTS

| | | | |
|---|---|---|---|
| 1,499,121 | 6/1924 | Parsonage et al. | 296/75 |
| 3,487,715 | 1/1910 | Strauss | 74/564 |
| 3,814,205 | 6/1914 | Miller | 180/90 |
| 3,841,431 | 10/1974 | Russey | 180/90 |
| 4,248,069 | 2/1981 | Burbank | 70/160 |
| 4,673,054 | 6/1987 | Burke et al. | 180/90.6 X |
| 4,888,968 | 12/1989 | Azvedo | 180/90 X |

FOREIGN PATENT DOCUMENTS 0099478  4/1970  Japan ................................. 180/90.6

Primary Examiner—Joseph F. Peters, Jr.
Assistant Examiner—Christopher P. Ellis
Attorney, Agent, or Firm—Jansson & Shupe, Ltd.

[57] ABSTRACT

The invention is an improvement in a mobile, operator-controlled machine (a crawler tractor, for example) which has a control-related panel such as an instrument panel. The improvement comprises a generally planar, plate-like member mounted for pivoting movement between a first position and a second position. In the first position, the plate protects the panel and in the second position, the plate provides an operator foot rest. That plate surface contacted by the operator's foot has a roughened, "anti-slip" portion. A stop device supports the plate against foot pressure and includes a frictionally-engaging socket and plunger to prevent the plate from "bounding" or bouncing as the machine travels.

12 Claims, 2 Drawing Sheets

MACHINE WITH DUAL-FUNCTION PANEL MEMBER

FIELD OF THE INVENTION

This invention is related generally to mobile machinery and, more particularly, to accessory equipment used on such machinery.

BACKGROUND OF THE INVENTION

In many types of mobile machines such as off-highway tractors (including crawler and rubber-tired tractors), a good deal of engineering effort has been devoted to machine performance. Less attention has been given to such aspects as improved operator comfort and protection of certain machine components when the machine is idle and unattended.

For example, when "working" mobile machinery, the machine operator is usually fully occupied with machine operation. That is, one or both hands and/or feet may be rather continuously in use, especially if the machine is equipped with one or more implements, e.g., a dozer blade, loader bucket, backhoe or the like.

On the other hand, there are times when machine operation is much simpler as when the implements are idle and the machine is being transported (under its own power) to another site. In the latter instances, the operator would like to (and safely can) assume a more relaxed position. And comfort during such periods would be enhanced if the operator could elevate one or both feet slightly.

Owners of such mobile machinery (and, to an extent, the machine operators) sometimes experience problems of another sort. Machines left idle at a site are sometimes subjected to adverse weather (possibly including damaging hail) or vandalism. The latter can range from "spray painting" to destruction of machine components. More vulnerable components include machine instruments, the glass faces of which are easily broken. And a more aggressive vandal may attempt theft of one or more instruments from the instrument panel. Breakage or theft of an instrument could make machine operation very risky-after all, the instruments are control-related and intended to inform the operator of "off normal" or dangerous conditions.

And instrument protection is not the only concern. An exposed machine ignition switch may tempt an unauthorized or untrained person to operate the machine, perhaps with disastrous results.

An improvement in mobile machines which addresses the twin concerns of enhanced operator comfort and protection of the machine instruments and ignition switch would be an important advance in the art.

OBJECTS OF THE INVENTION

It is an object of this invention to provide a machine improvement overcoming some of the problems and shortcomings of devices of the prior art.

Another object of this invention is to provide a machine improvement which offers a convenient place for a machine operator to rest one or both feet.

Still another object of this invention is to provide a machine improvement which protects the control-related panel from vandalism and adverse weather.

How these and other important objects are accomplished will become apparent from the following descriptions taken in conjunction with the drawing.

SUMMARY OF THE INVENTION

The invention is an improvement in a mobile, operator-controlled machine having a control-related panel such as an instrument panel. The improvement comprises a generally planar, plate-like member mounted for pivoting movement between a first position and a second position. Member mounting is along its first or lower edge. In the first position, the member protects the panel and in the second position, the member provides an operator foot rest.

That surface contacted by the operator's foot, the first surface, is rough, i.e., has an "anti-slip" portion. When the member is in the first or "folded up" position, the first surface faces the panel. The member is preferably rigid and has a second or upper edge with means for attaching a padlock to such edge. The member may thereby be locked in the first or panel-protecting position, thereby guarding the panel against vandalism.

A stop device is engaged by the member when it is in the second position and restrains the member against the weight of the operator's foot. Off-highway mobile machines, e.g., crawler tractors, have a pronounced tendency to be rough-riding. Therefore, the stop device includes a retainer preventing bounding or "bouncing" movement of the member as the machine travels.

A highly preferred stop device has a cup-like socket and a plunger frictionally engaging the socket when the member is in the second or "folded down" position. The plunger is mounted on a support bracket stationary with respect to the panel and the socket is mounted on the second surface of the panel and moves into and out of engagement with the plunger as the panel is moved between positions.

DETAILED DESCRIPTIONS OF THE PREFERRED EMBODIMENTS

Figure 1:
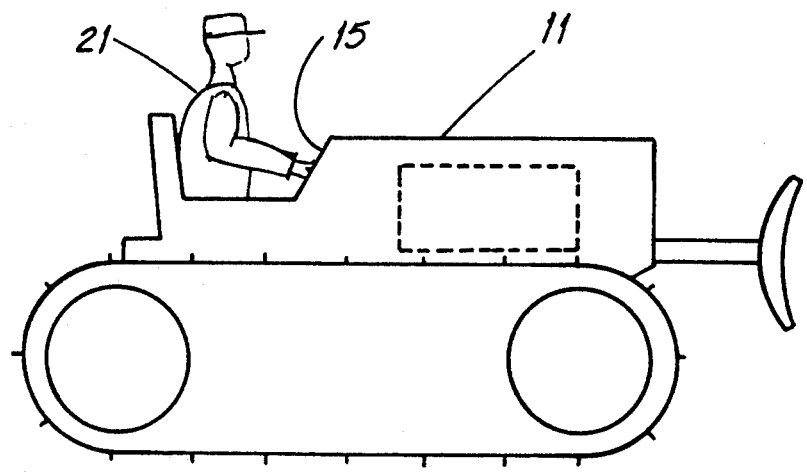
FIG. 1 is a simplified side elevation view of a type of mobile machine, i.e., a crawler tractor.
Figure 2:
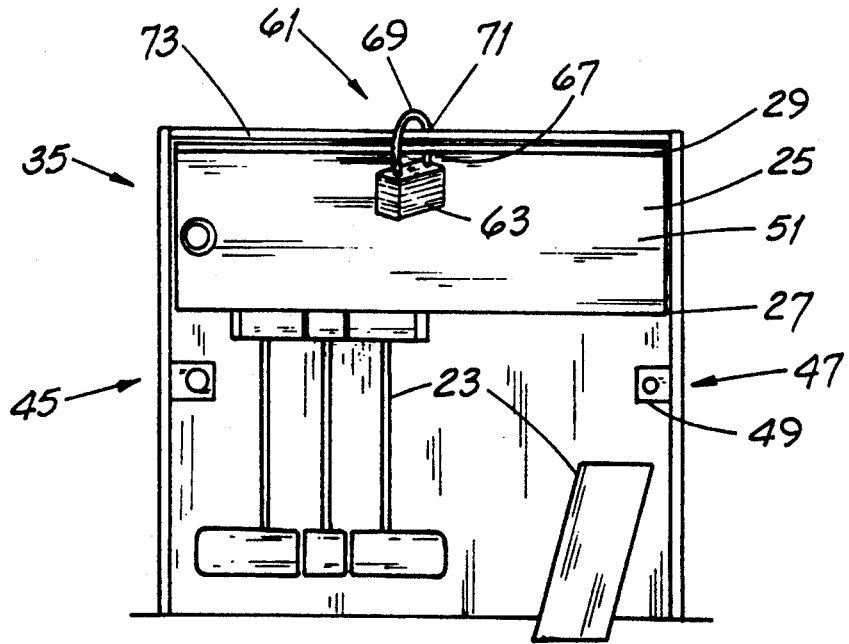
FIG. 2 is a front elevation view, with panel member closed, of the operating panel and foot pedals as seen by the machine operator.
Figure 3:
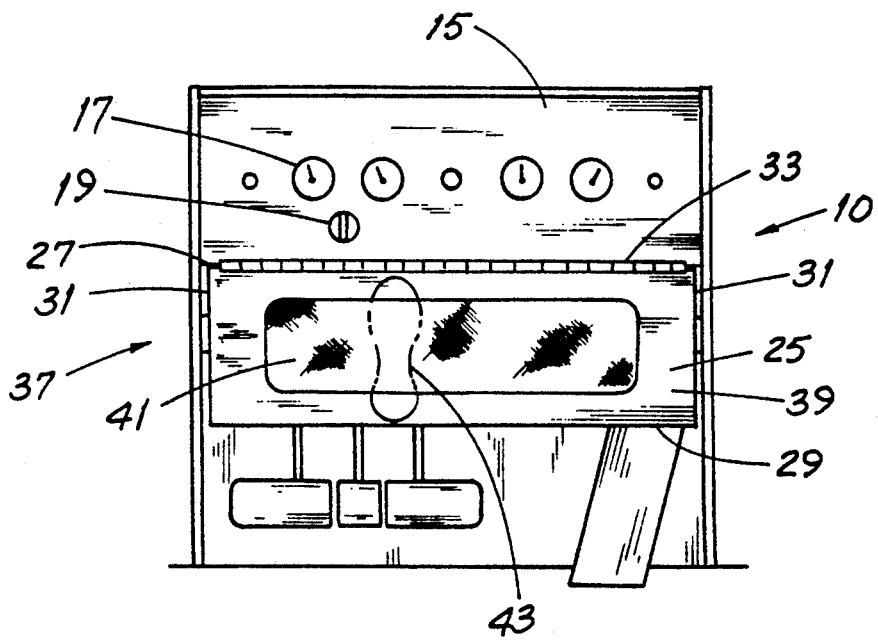
FIG. 3 is a front elevation view, with panel member open, of the operating panel and foot pedals as seen by the machine operator.

Referring to FIGS. 1, 2 and 3, the machine improvement 10 is shown in conjunction with a mobile machine such as an exemplary crawler tractor 11. The tractor 11 includes an operator's compartment 13 with seat and a control-related panel 15. The panel 15 has instruments 17, an ignition switch 19 and the like mounted on it for easy access and viewing by the operator 21. Foot pedals 23 are mounted below the panel 15.

The improvement 10 includes a rigid, rectangular, generally planar panel member 25 having a first edge 27, a second edge 29 and a pair of side edges 31. In the exemplary embodiment, the edges 27 and 29 are generally parallel to one another as are the edges 31. Of course, machines having other configurations may require panel members 25 of different shapes.

A "piano-type" hinge 33 extends along the first edge 27 and mounts the member 25 for pivoting movement between a first position 35, shown in FIG. 2, and a second position 37 as shown in FIG. 3. The member 25 covers and protects the panel 15 in the first position 35 and provides an operator foot rest in the second position 37.

The member 25 includes a first surface 39 which faces the panel 15 when the member 25 is in the first position 35 and which faces outward toward the operator 21 when the member 25 is in the second position 37. Such surface 39 is roughened, either by "scarifying" the surface per se or by adhering a sandpaper-like coating 41 thereto. When the operator's foot 43 rests on the surface 39, such foot 43 is more securely retained and constrained from slipping off.

The machine improvement 10 includes at least one stop device 45, and preferably a pair of such devices 45, 47 each mounted on a support bracket 49 stationary with respect to the panel 15. The devices 45, 47 are preferably configured and arranged so that when the member 25 is in the second position 37, the second surface 51 engages and bears against such devices 45, 47. In that way, the member 25 is restrained against the weight of the operator's foot 43.

Figure 4:
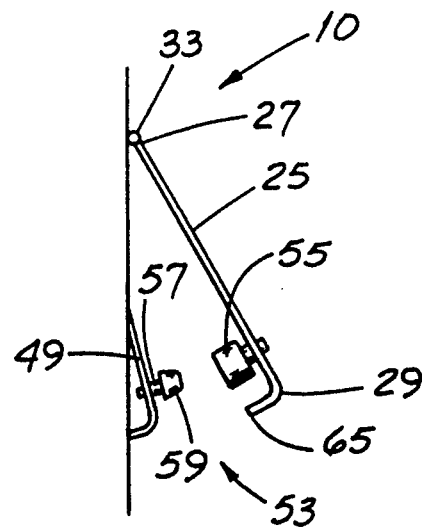
FIG. 4 is a side elevation view of a panel member stop device.

One of the stop devices 45, e.g., that on the left as shown in FIG. 2, has a retainer 53 which prevents "bounding" or bouncing movement of the member 25 as the tractor 11 travels. As shown in FIG. 4, the retainer 53 includes a cup-like socket 55 and a plunger 57 frictionally engaging the socket 55 when the member 25 is in the second position 37. The socket 55 is mounted to protrude from the second surface 51 of the member 25, move with the member 25 and be in registry with the plunger 57 when the member 25 is folded down. The plunger 57 has a tapered head 59 shaped like a truncated cone to permit easy initial socket-plunger engagement and yet provide a friction fit therebetween when the member 25 is folded fully down.

Referring particularly to FIGS. 2 and 4, the second edge 29 of the member 25 includes means 61 for attaching a padlock 63 thereto so that the member 25 may be locked in a panel-protecting position 35. Such attaching means 61 includes a lip 65 extending from the second edge 29 at generally a right angle to the surfaces 39, 51.

The lip 65, which extends toward the viewer in the depiction of FIG. 2, has a hole 67 through it. Such lip 65 is sized to accept a padlock shank 69 and located to be in registry with a companion hole 71 in the panel edge 73. Since the panel edge 73 is rigid and is rigidly formed with the tractor 11, the member 25 can be locked in the first position 35, thereby protecting the panel 15 from vandalism and adverse weather.

From the foregoing, it will now be appreciated that the highly innovative, dual-function panel member 25 provides important advantages in operator comfort and maintenance of machine integrity.

While the principles of this invention have been described in connection with specific embodiments, it should be understood clearly that these descriptions are made only by way of example and are not intended to limit the scope of the invention.

I claim:

1. In a mobile machine controlled by an operator and having at least one foot-operated pedal and at least one control mounted on a panel, the improvement comprising:
   a cover member having first and second surfaces and being mounted for movement between a first panel-covering position and a second panel-exposing position and wherein;
   in the first position, the first surface faces toward the control;
   in the second position, the first surface faces toward the operator and provides a foot rest only when the operator is seated in a position to operate the machine; and,
   in the second position, the first surface is spaced from the pedal and the pedal is exposed for foot operation.

2. The machine of claim 1 wherein the first surface is rough whereby the operator's foot is more securely retained thereon.

3. The machine of claim 2 wherein the member is mounted for pivoting movement between the positions and in the first position, the first surface faces the panel.

4. The machine of claim 3 whereby the member is rigid and may be locked in the first position, thereby protecting the panel against vandalism.

5. The machine of claim 1 including at least one stop device engaged by the member in the second position, thereby restraining the member against the weight of the operator's foot.

6. The machine of claim 5 wherein the stop device includes a retainer preventing bounding movement of the member as the machine travels.

7. The machine of claim 6 wherein the retainer includes a cup-like socket and a plunger frictionally engaging the socket when the member is in the second position.

8. The machine of claim 7 wherein the member includes a second surface having the socket mounted thereto and moving therewith and the plunger is mounted on a support bracket stationary with respect to the panel.

9. The machine of claim 1 wherein the member is generally planar, has a first edge and is pivotably mounted along the first edge.

10. The machine of claim 9 wherein the member has a second edge including means for attaching a padlock thereto whereby the member may be locked in a panel-protecting position.

11. In a mobile machine controlled by an operator and having a control-related panel, the improvement comprising:
   a member mounted for movement between a first position and a second position, the member protecting the panel in the first position and providing an operator foot rest in the second position;
   at least one stop device engaged by the member in the second position to restrain the member against the weight of the operator's foot;
   the stop device including a retainer preventing bounding movement of the member as the machine travels;
   the retainer including a cup-like socket and a plunger frictionally engaging the socket when the member is in the second position.

12. The machine of claim 11 including a support bracket and wherein:
   the member includes a first surface and a second surface;
   the socket is mounted on the second surface and moves therewith and the plunger is mounted on the support bracket which is stationary with respect to the panel.

* * * * *